United States Patent [19]
Nielsen

[11] Patent Number: 5,963,964
[45] Date of Patent: Oct. 5, 1999

[54] METHOD, APPARATUS AND PROGRAM PRODUCT FOR UPDATING VISUAL BOOKMARKS

[75] Inventor: Jakob Nielsen, Atherton, Calif.

[73] Assignee: Sun Microsystems, Inc., Palo Alto, Calif.

[21] Appl. No.: 08/628,414

[22] Filed: Apr. 5, 1996

[51] Int. Cl.[6] ................................................. G06F 17/21
[52] U.S. Cl. .......................................................... 707/501
[58] Field of Search .............................. 395/762; 707/501, 707/513; 709/218; 345/333, 335, 348, 349

[56] References Cited

U.S. PATENT DOCUMENTS

| | | | |
|---|---|---|---|
| 5,140,678 | 8/1992 | Torres | 395/350 |
| 5,199,104 | 3/1993 | Hirayama | 395/350 |
| 5,341,293 | 8/1994 | Vertelney et al. | 369/419 |
| 5,442,795 | 8/1995 | Levine et al. | 395/800 |
| 5,500,929 | 3/1996 | Dickinson | 395/350 |
| 5,517,605 | 5/1996 | Wolf | 395/350 |
| 5,530,852 | 6/1996 | Meske, Jr. et al. | 395/600 |
| 5,572,643 | 11/1996 | Judson | 395/793 |
| 5,625,781 | 4/1997 | Cline et al. | 395/335 |
| 5,692,073 | 11/1997 | Cass | 382/219 |
| 5,717,940 | 2/1998 | Peairs | 395/777 |
| 5,781,785 | 7/1998 | Rowe et al. | 707/513 |

OTHER PUBLICATIONS

Hyper Card User's Guide, Apple Computer, Inc., Cover Page, Copyright Page and pp. 26, 27 and 139.

*Primary Examiner*—Joseph H. Feild
*Attorney, Agent, or Firm*—McDermott, Will & Emery

[57] ABSTRACT

Methods, systems, and computer program products are disclosed for creating, displaying, selecting, updating, and using visual bookmarks. A visual bookmark is a reduced graphical image of a web page that is associated with the URL for that web page. The invention allows the user to view a bookmarked web page by selecting a visual bookmark of the desired page from a plurality of visual bookmarks instead of making a selection from a list of web page titles. One way the visual bookmark is created is when the user decides to add a displayed web page to the user's bookmark list. This causes the displayed image to be captured, reduced, and associated with the web page's URL and title.

15 Claims, 17 Drawing Sheets

METHOD, APPARATUS AND PROGRAM PRODUCT FOR UPDATING VISUAL BOOKMARKS

FIELD OF THE INVENTION

The present invention relates to an improved method and system for providing bookmarks in computerized information systems.

BACKGROUND OF THE INVENTION

Almost all hypertext systems provide a facility for providing easy and fast access to a user's favorite pages on the World Wide Web ("web pages"). Such a facility is often referred to as a hotlist or a bookmark list. Existing systems depict the bookmark list as a textual list of web page titles (called "bookmarks") in a pull-down menu on a web browser. A typical pull-down menu also permits users to add new bookmarks to the list, update the titles associated with the web pages, and display the updated lists.

An example of how bookmarks are created, displayed, updated, and used to access web sites is demonstrated below using the Netscape Navigator™ browser from Netscape Communications Corporation ("Netscape"). Bookmark creation is typically user initiated. First, the user launches a browser program for browsing the Internet. FIG. 1 is a diagram of a user interface 100 for the Netscape Navigator browser from Netscape. Next, the user accesses a web site of interest (i.e., a web site which the user eventually wants to save as a bookmark) by inserting a Universal Resource Locator ("URL") into an "Open Location" dialog box and selecting an "Open" button. The "Open Location" dialog box is typically accessed by selecting an "Open" button 102 on a command bar 104 of the browser user interface 100. FIG. 2 illustrates an Open Location dialog box 200, loaded with a URL 202 for the Sun Microsystems'198 home page. Dialog box 200 also includes a button 204. When button 204 is actuated the browser retrieves the web page indicated by the URL and displays the retrieved web page on the user's computer. FIG. 3 illustrates the February 1996 home page of Sun Microsystems as displayed in the web page viewer section 300 of the browser 100 in response to actuation of button 204.

In order to save the Sun Microsystems home page as a bookmark, the user selects a bookmarks menu item 302 from a menu bar 304. FIG. 4 illustrates a state of the browser 100 after the user has selected the bookmarks menu item 302. As FIG. 4 illustrates, selection of the bookmarks menu item displays a bookmarks pull-down menu 400. The bookmarks pull-down menu consists of two primary components: a command section 402 and a bookmarks section 404. The command section initially displays an "Add Bookmark" command 406 and a "View Bookmark" command 408. In general, the bookmarks section displays all previously saved bookmarks. The bookmarks section displayed in FIG. 4 illustrates a five item list of previously saved bookmarks. In order to save the current web page as a new bookmark, the user selects the "Add Bookmarks" command from the command section 402.

FIG. 5 illustrates a state of the bookmarks pull-down menu 400 after the Sun Microsystems home page has been added as entry 500. Using the techniques discussed above, a user is able to save a bookmark for a favorite web site.

The process of displaying a web page associated with a bookmark is also user initiated. FIG. 6 illustrates the Netscape browser user interface as it displays CNN's Financial Network home page. The example which follows illustrates how a user, who is currently displaying CNN's home page on his or her browser, can use the Sun Microsystems bookmark 500 (FIG. 7) to display Sun Microsystem's home page without using an "Open Location" dialog box. In short, the user positions a pointing device, such as a mouse pointer, over the Sun Microsystems bookmark, and actuates a mouse button to select the bookmark. In response to the user's selection, the browser displays Sun's home page (FIG. 8).

The process of updating a bookmark is also user initiated. First the user selects the "View Bookmarks" command 408 from the command section 402 (FIG. 9). In response to selection of the "View Bookmarks" command, a bookmarks dialog box 1000 with edit control button 1002 is displayed. FIG. 10 illustrates the bookmarks dialog box displayed in response to actuation of the "View Bookmarks" command from the bookmarks pull-down menu. The dialog box 1000 displays a list of the bookmarks currently stored by the browser. The user traverses the list by actuating a slider button 1004. FIG. 11 illustrates a state of the dialog box after the user has traversed the list of bookmarks and has arrived at entry 1100 containing the Sun Microsystems bookmark. By actuating edit button 1002, the dialog box 1000 expands to become dialog box 1200 (FIG. 12). Dialog box 1200 contains additional edit control buttons 1202, 1204, and 1206. Edit control button 1202 allows a user to add a URL to a location field 1208. Edit control button 1204 allows a user to add a new header name to a name field 1210. Edit control button 1206 allows a user to insert a graphical separation image in the list of bookmarks in dialog box 1000 (FIG. 10). A user uses the edit control buttons to update data associated with bookmarks from the bookmark list.

Existing bookmark methods and systems cause four primary problems. First, some page designers do not include titles (for example for purely graphical pages) and therefore there is no text to put into the browser's list of bookmarks. Second, some titles are hard to recognize for users. For example, the web page entitled "Money and Investment Update" is probably most frequently thought of by users as the Wall Street Journal's web page. Third, visually oriented users may not like having to scan large boring lists of text. Finally, illiterate users, for example young children, may not be able to read the lists at all.

Embodiments of the present invention overcome the deficiencies of the prior art.

SUMMARY OF THE INVENTION

Embodiments of the present invention provide a method and system for creating, displaying, selecting, updating, and using visual bookmarks. For example, when a user decides to bookmark a web page, embodiments of the invention take a screendump of the visual appearance of the web page in the browser. This screendump is then graphically reduced in size. The browser stores the bookmark image as the representation of the destination of the bookmark. The browser also stores the URL for the page, as well as its title.

To display images only or both images and text, the browser performs the following steps. When the user requests display of the bookmark list, the browser presents a page with a two-dimensional layout of the bookmark images. If the bookmark display setting is set to display both images and titles then the title is shown under the image.

The web page associated with a bookmark image is displayed when the user selects one of the bookmark images. As a result of the selection, the browser will retrieve and display the web page at the URL associated with the bookmark image.

To update bookmark representation the browser performs the following steps. Preferably during periods of low load, the browser retrieves one page at a time corresponding to the stored URLs. For each retrieved page, the browser computes a new bookmark image using the method as described above, with one exception, when the page was originally bookmarked, it was visible in the browser window, but when computing updated small images, the browser preferably draws the page on an off-screen bitmap (not shown) thus making it invisible to anybody who might be looking at the computer screen. As soon as an updated bookmark image has been computed for the bookmark, the browser deletes the previous bookmark image. The browser also retrieves and replaces the previously stored title of the page with its new title.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

For example, while the preferred embodiment of the present invention involves use of the Internet, those of ordinary skill will understand that any hypertext-enabled network could be used to implement embodiments of the present invention.

DETAILED DESCRIPTION

Overview Of The Preferred Method

Embodiments of the present invention provide a method and system for creating, displaying, selecting, updating, modifying, and using visual bookmarks. For example, one embodiment facilitates the creation of the visual bookmark. When a user decides to bookmark a page, this embodiment of the invention takes a screendump of the visual appearance of the web page in the browser. This screendump is then graphically reduced in size. The browser stores the reduced image as the representation of the destination of the bookmark, and associates the image with both the URL for the page, as well as its title.

Another embodiment facilitates the display of the visual bookmark. In a preferred embodiment, the browser in fact has a preference setting to switch between three different ways of displaying bookmarks: display images only, display titles only, and display both images and titles. The preferred default setting is to display both images and titles. If the bookmark display setting is set to display titles only, the browser will act the same way as current browsers do.

If the bookmark display setting is set to display images only or both images and text, then the browser performs the following steps. When the user requests display of the bookmark list, the browser presents a page with a two-dimensional layout of the bookmark images. If the bookmark display setting is set to display both images and titles then the title is shown under the image.

Yet another embodiment facilitates accessing the web page associated with a bookmark image when the user selects one of the bookmark images. As a result of the selection, the browser will retrieve and display the web page at the URL associated with the image.

Another embodiment facilities the updating of bookmark image. The browser has a preference setting to allow the user to determine whether the bookmark representations should be updated or whether they should be kept constant. The default value is to update the bookmark representations on a periodic basis. If the preference setting is set to update the bookmark representations the browser performs the following steps. The browser retrieves one page at a time corresponding to the stored URLs, if a threshold amount of time has passed since it was last retrieved by the browser. For each retrieved web page, the browser computes a new bookmark image using the method as described above, with one exception, when the page was originally bookmarked, it was visible in the browser window, but when computing updated small images, the browser preferably draws the page on an off-screen bitmap (not shown), thus making it invisible to anybody who might be looking at the computer screen. As soon as an updated bookmark image has been computed for the bookmark, the browser replaces the previous bookmark image with the updated bookmark image. The browser also replaces the previously stored title of the web page with its new title.

Overview Of The Preferred System

Figure 1:
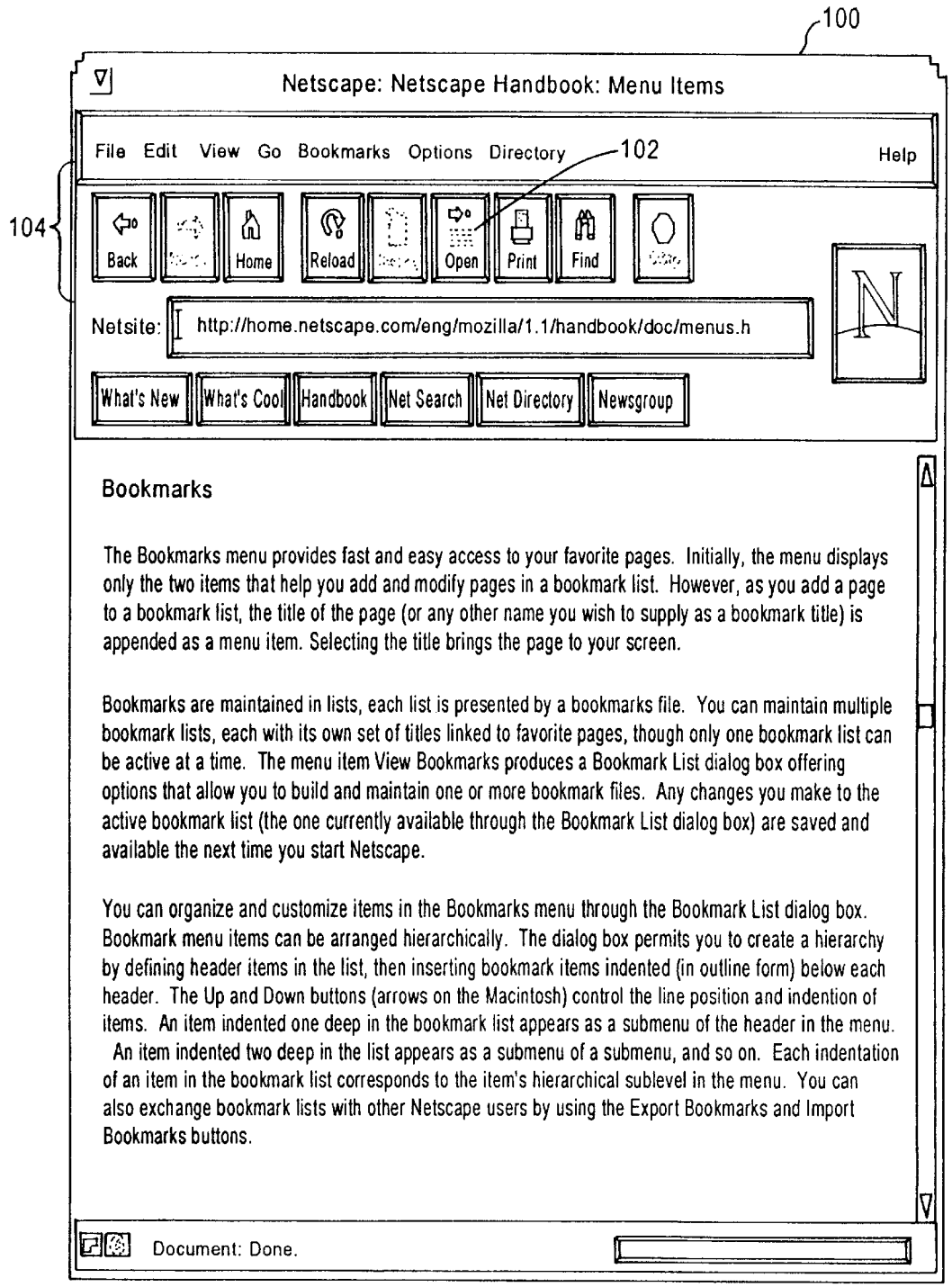
FIG. 1 is a diagram of a user interface for the Netscape Navigator™ browser from Netscape Communications Corporation.
Figure 2:
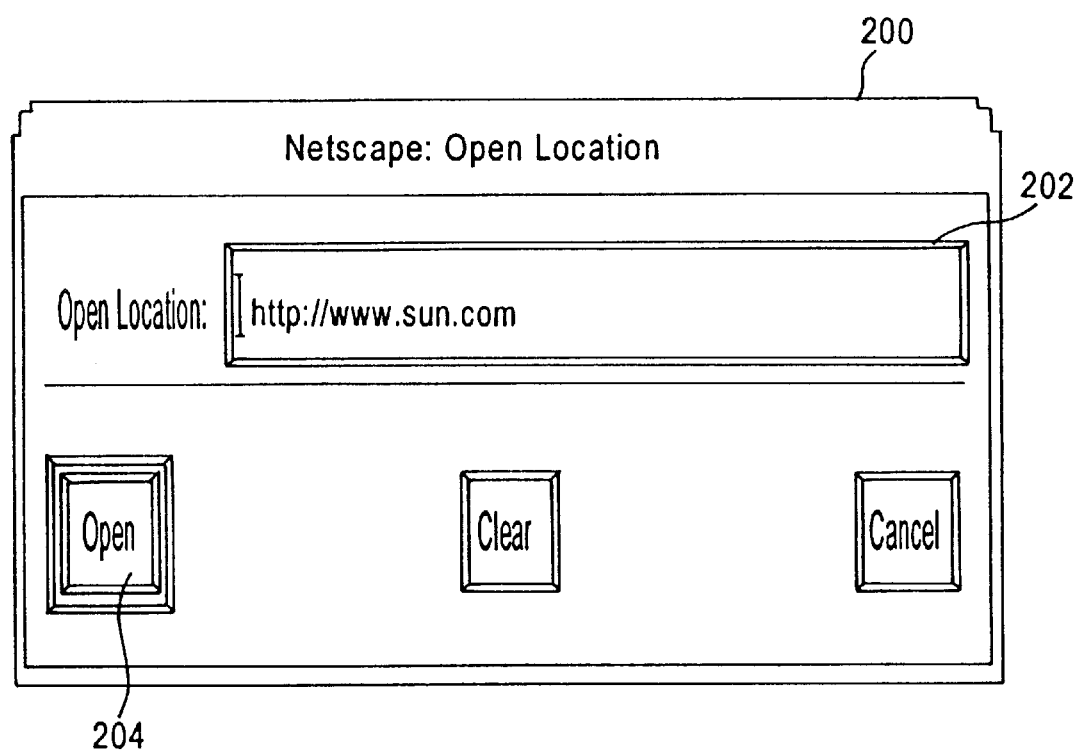
FIG. 2 illustrates an Open Location dialog box, loaded with a URL for the Sun Microsystems'™ home page.
Figure 3:
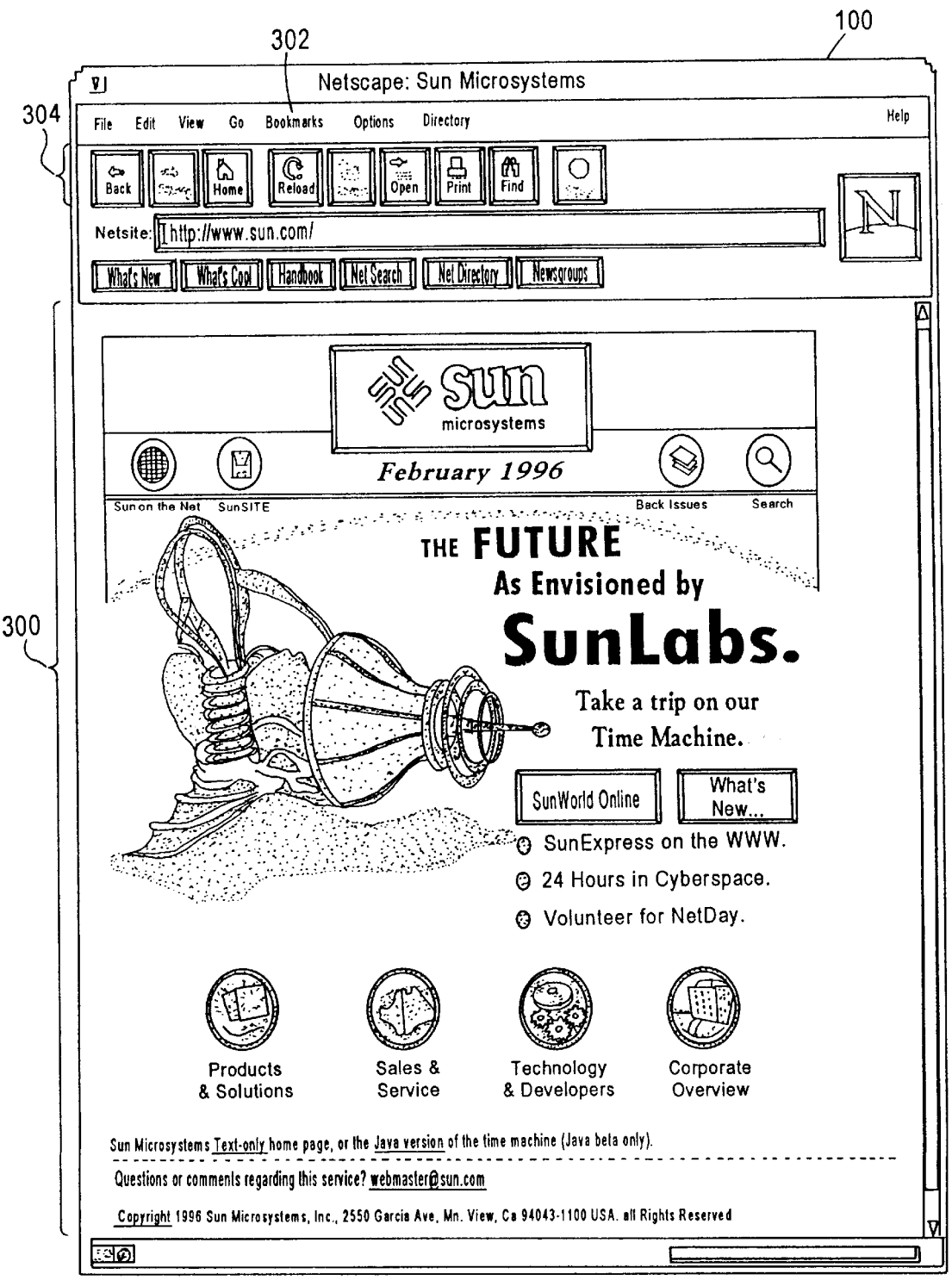
FIG. 3 illustrates the February 1996 home page of Sun Microsystems as displayed in the web page viewer section of the Netscape Navigator browser.
Figure 4:
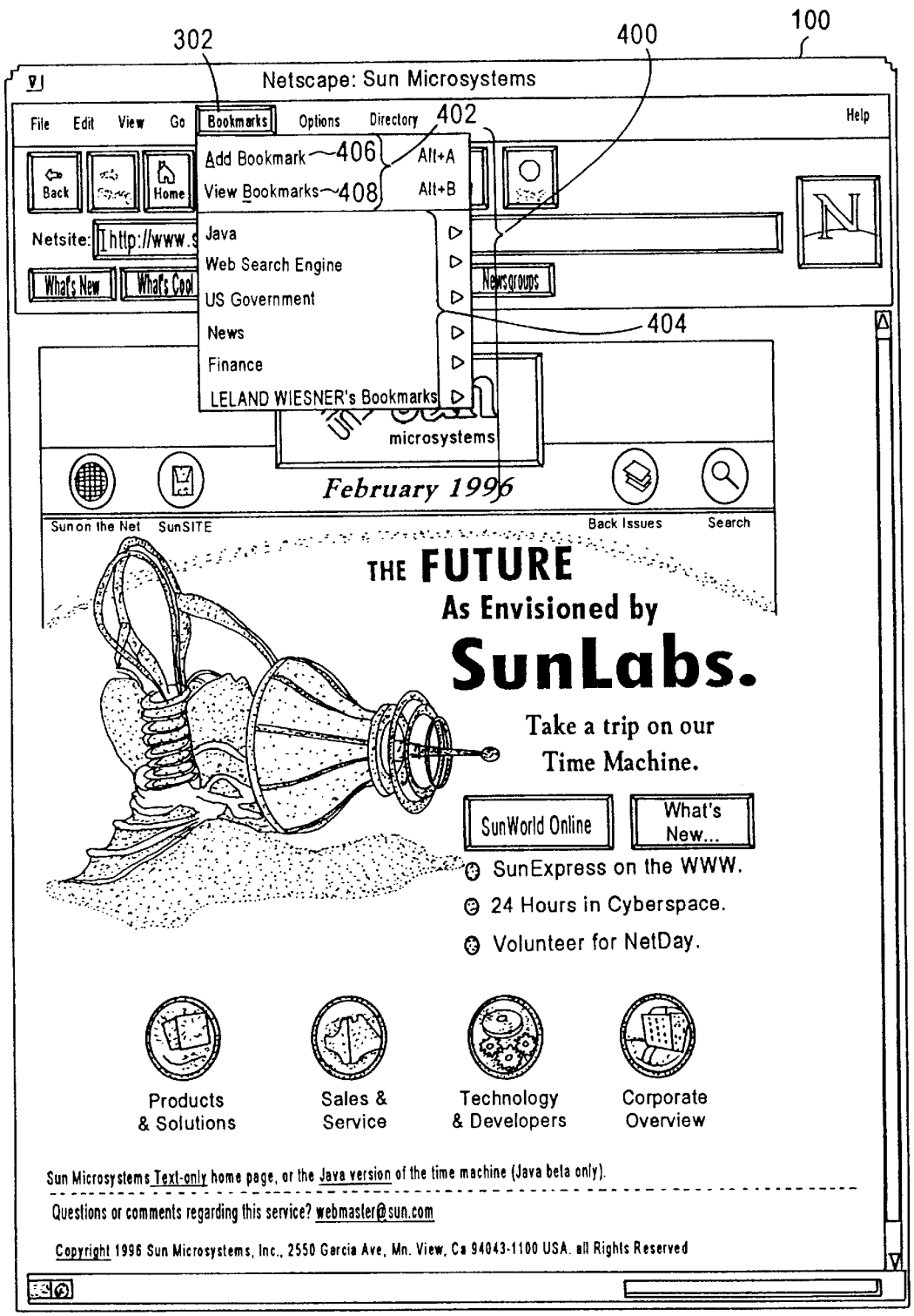
FIG. 4 illustrates a state of the browser after display of a bookmarks pull-down menu.
Figure 5:
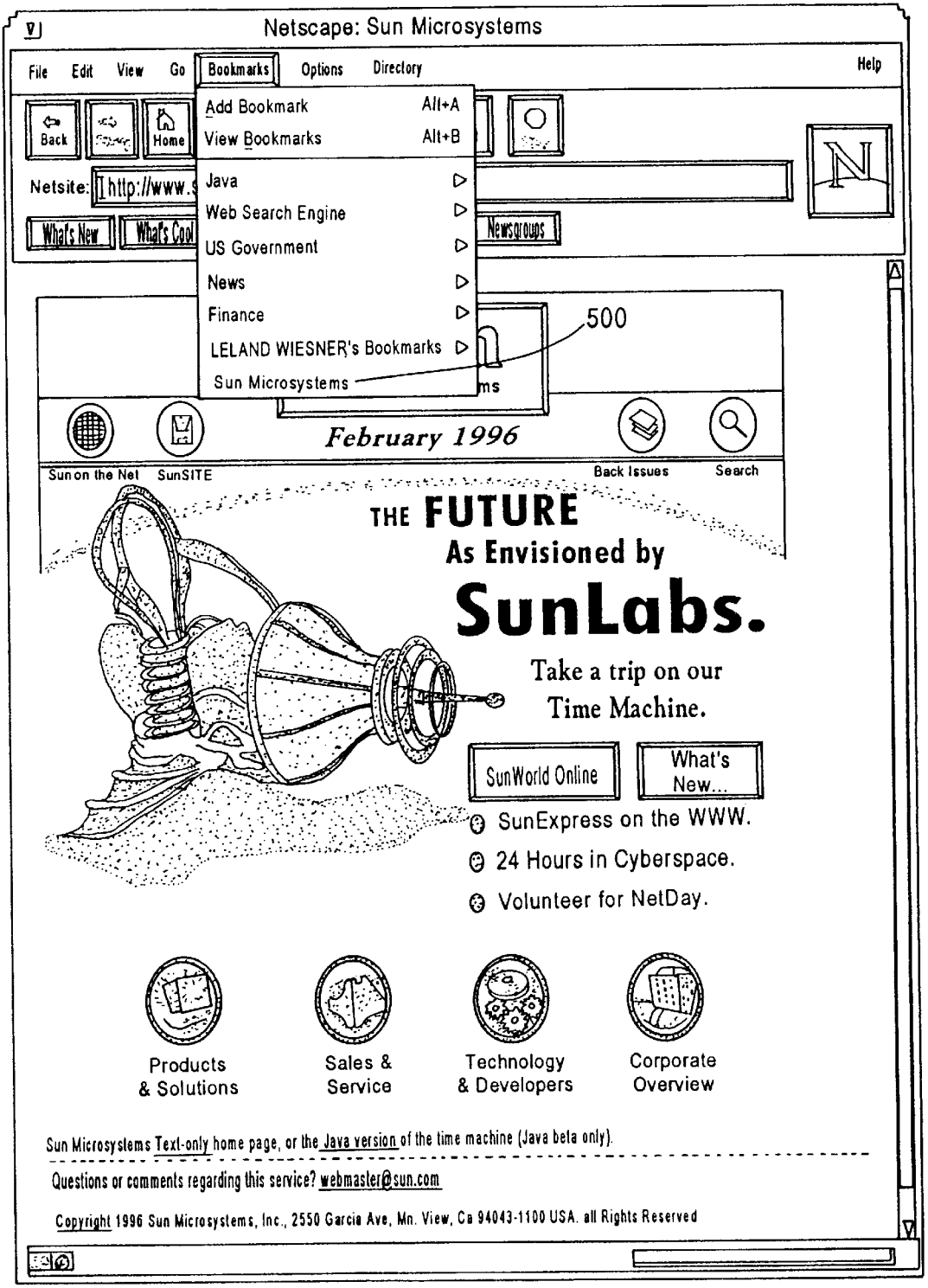
FIG. 5 illustrates a state of the bookmarks pull-down menu after the Sun Microsystems home page has been added as an entry.
Figure 6:
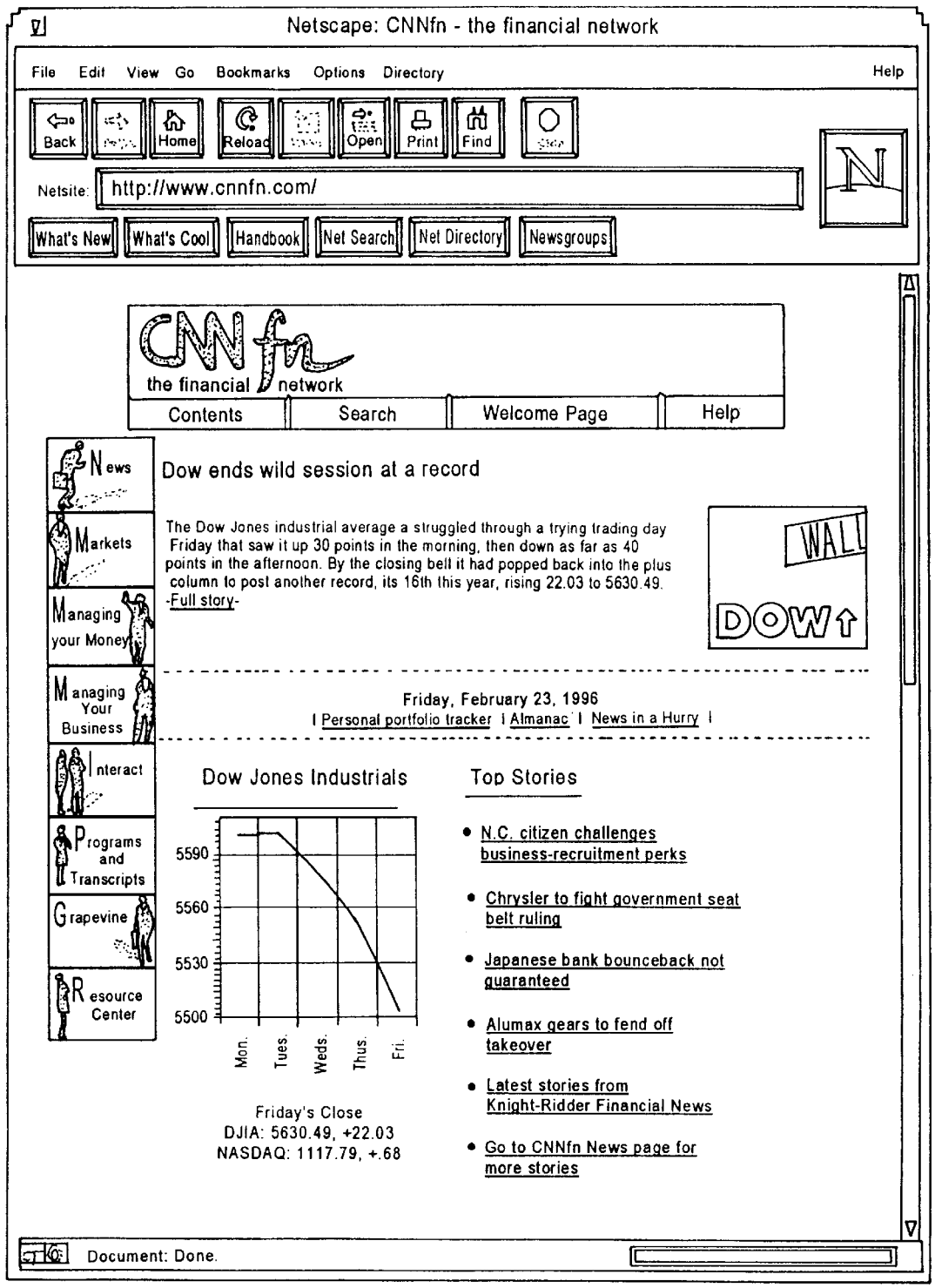
FIG. 6 illustrates the Netscape browser user interface as it displays CNN's Financial Network home page.
Figure 7:
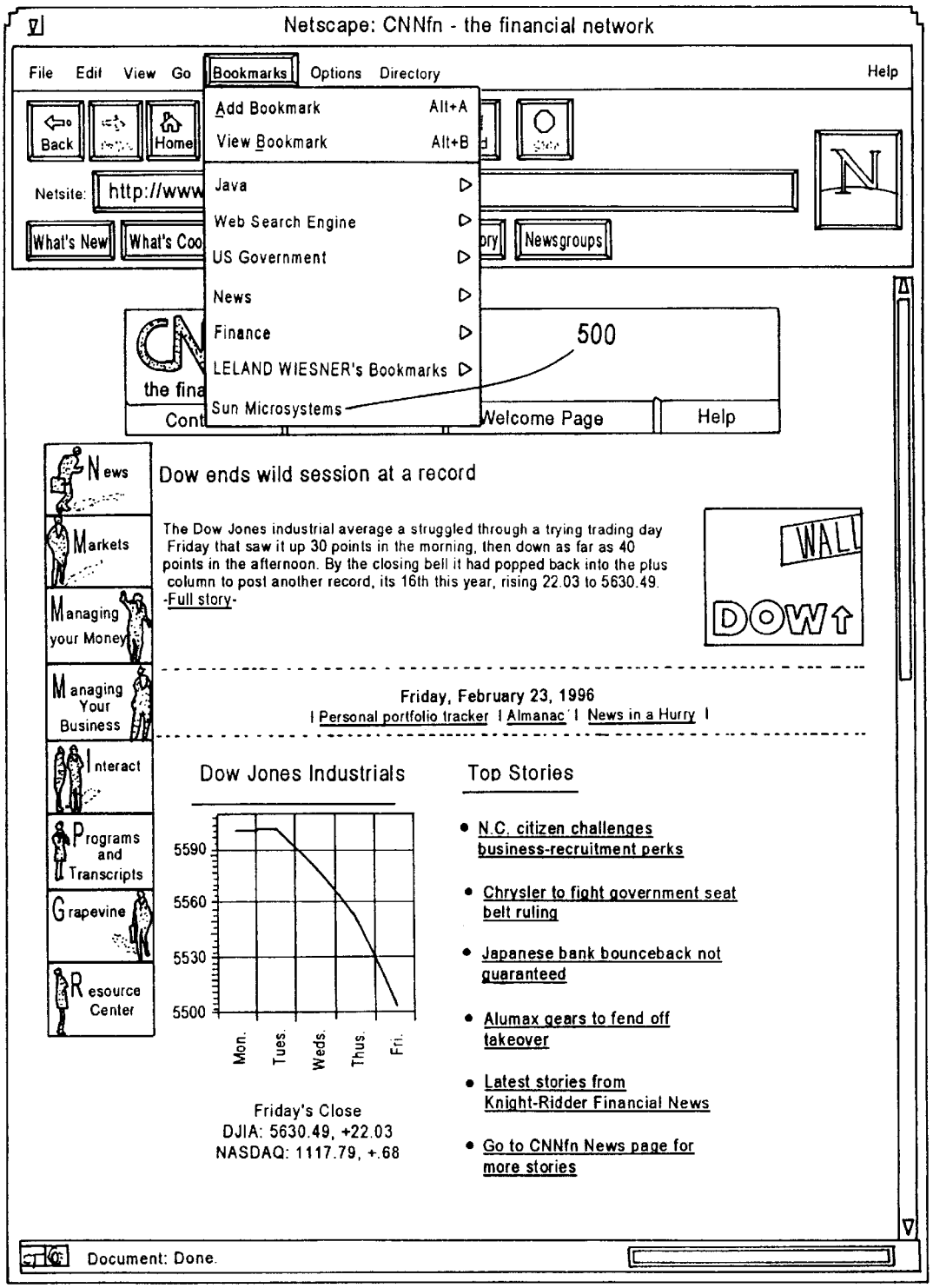
FIG. 7 illustrates a state of the browser after a user selects a bookmarks pull-down menu while displaying CNN's Financial Network home page.
Figure 8:
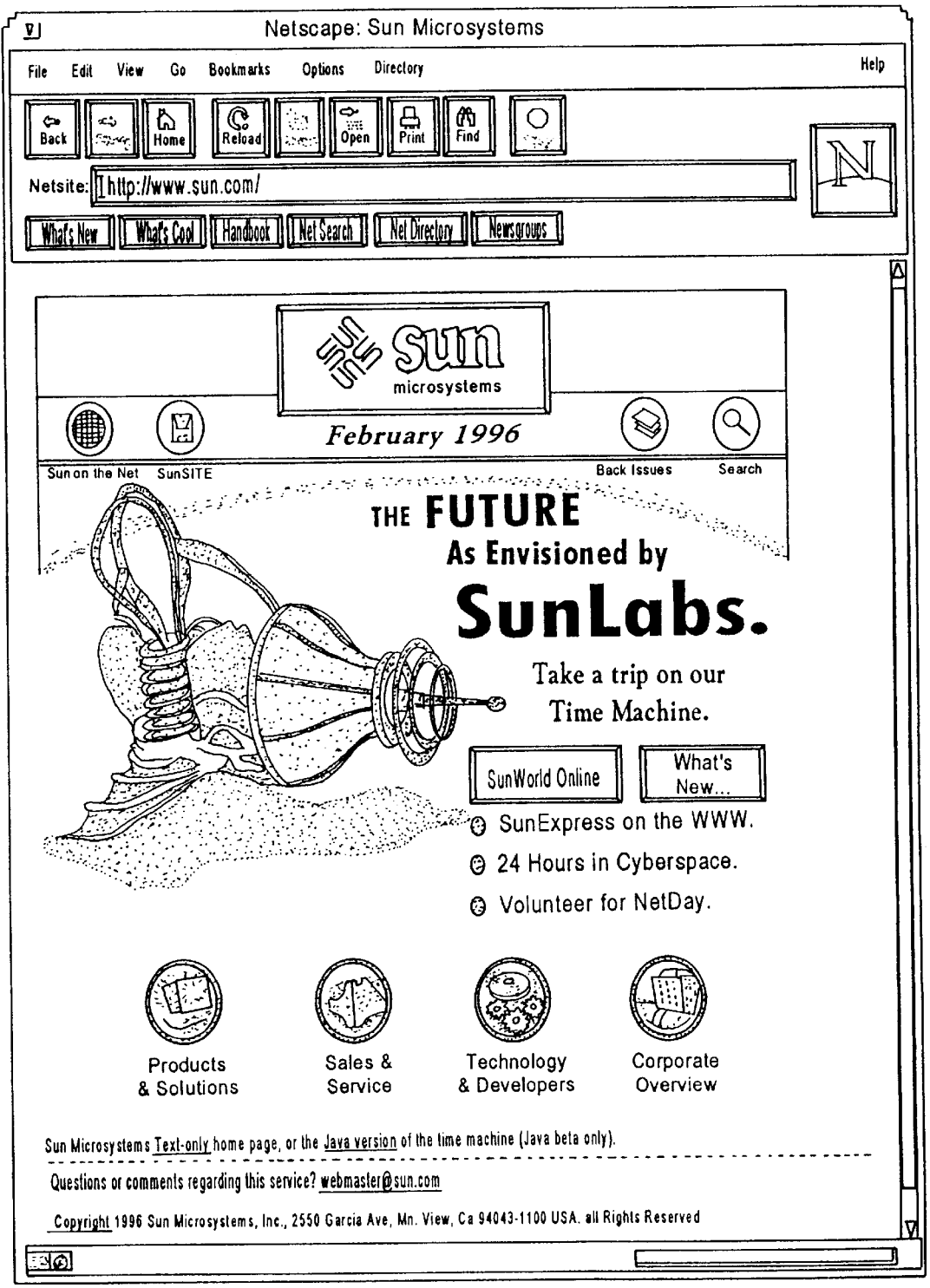
FIG. 8 illustrates the February 1996 home page of Sun Microsystems as displayed in a web page viewer section of the browser in response to actuation of an Open Location button.
Figure 9:
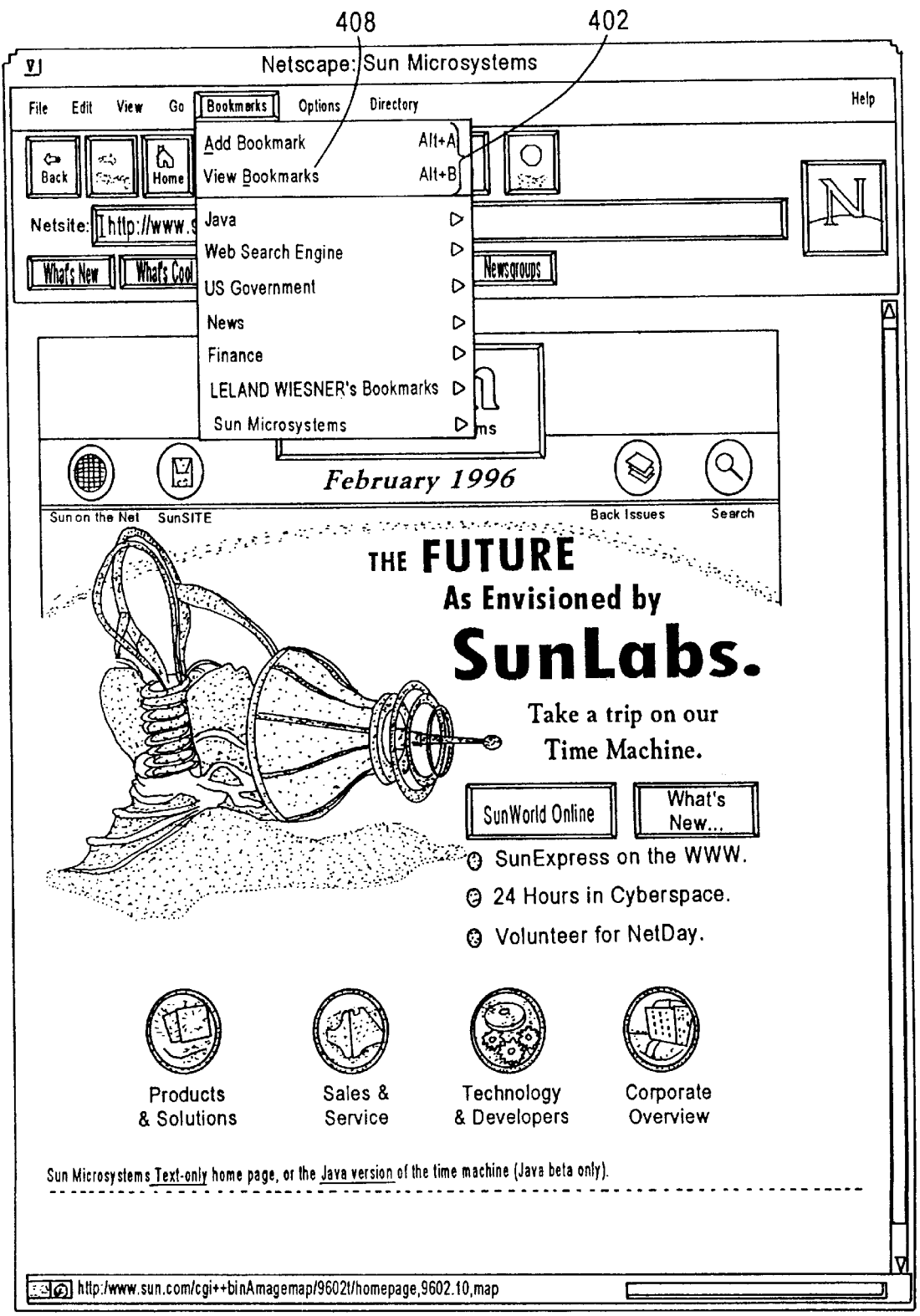
FIG. 9 illustrates the February 1996 home page of Sun Microsystems as displayed in the web page viewer section of the Netscape Navigator browser.
Figure 10:
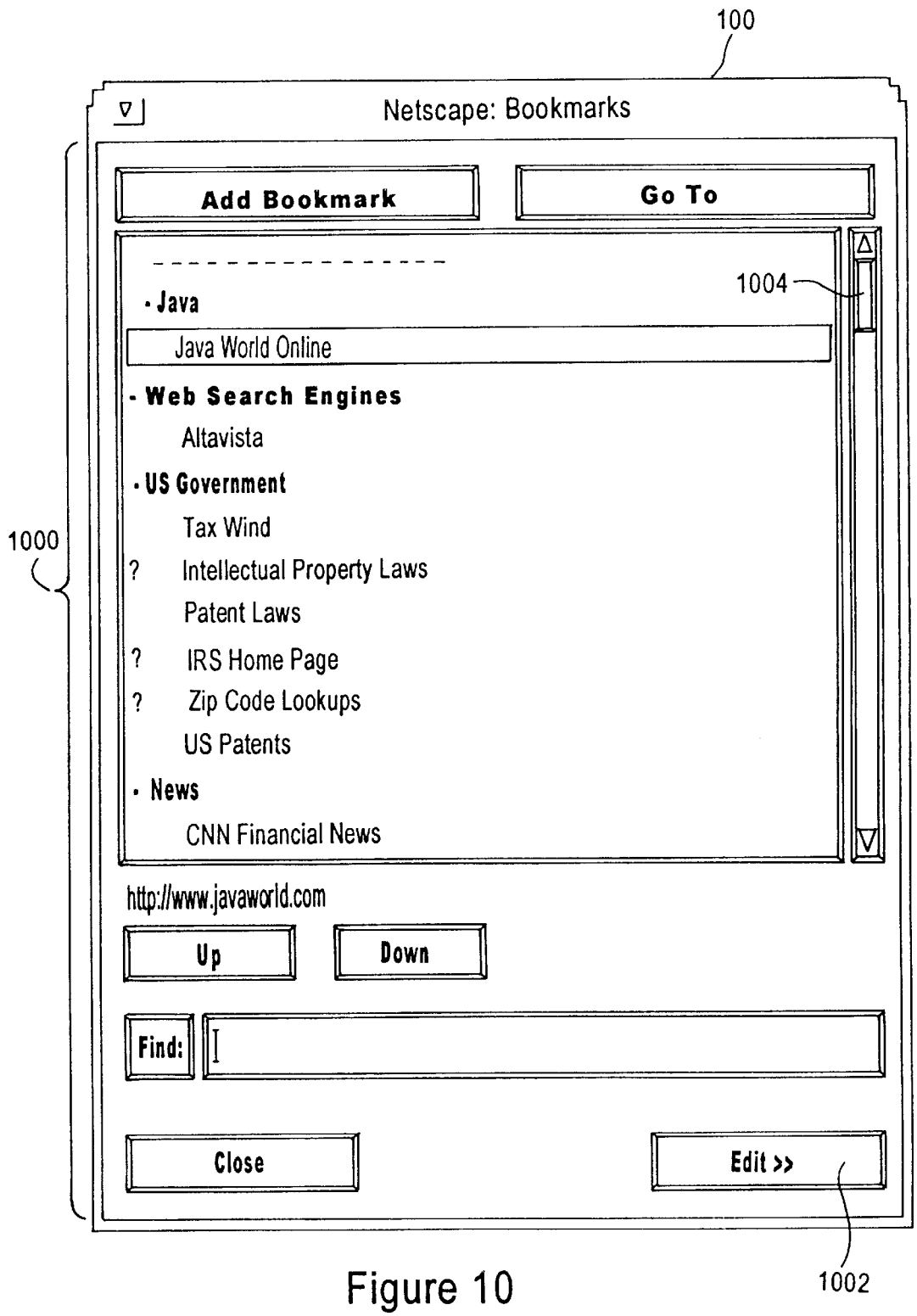
FIG. 10 illustrates the bookmarks dialog box displayed in response to actuation of the "View Bookmarks" command from the bookmarks pull-down menu.
Figure 11:
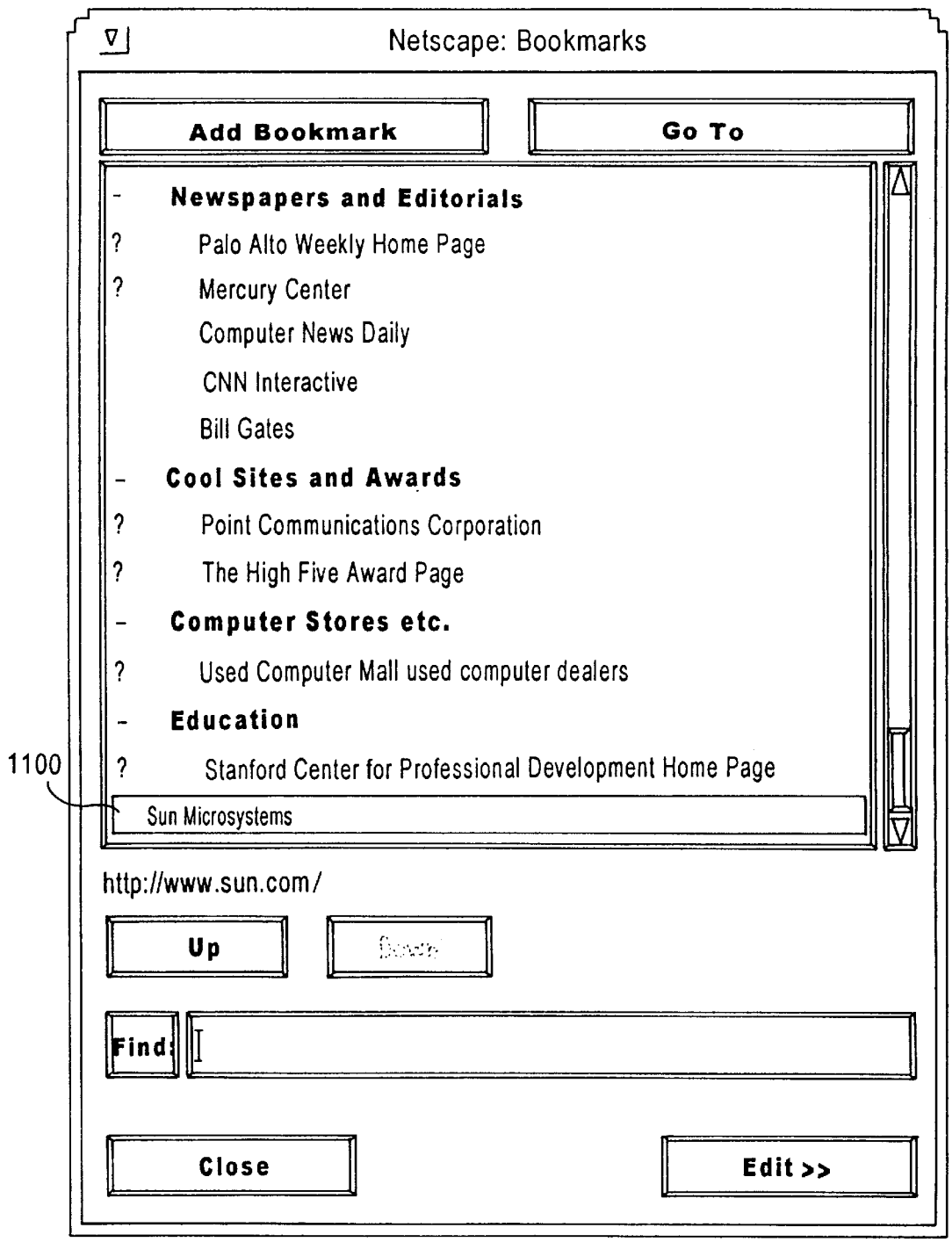
FIG. 11 illustrates a state of the dialog box of FIG. 10 after the user has traversed the list of bookmarks and has arrived at entry containing the Sun Microsystems bookmark.
Figure 12:
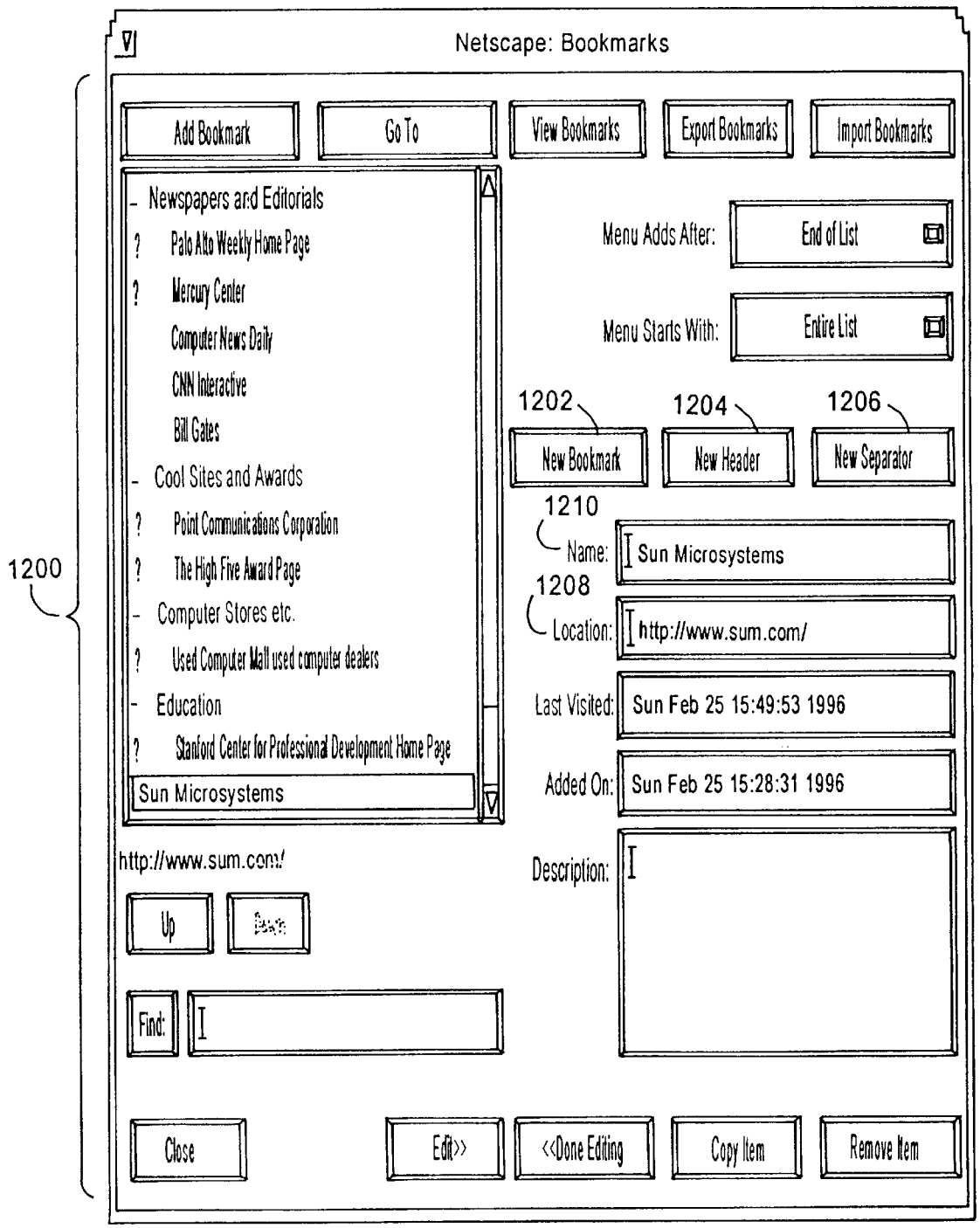
FIG. 12 illustrates an expanded version of the dialog box of FIG. 10.
Figure 13:
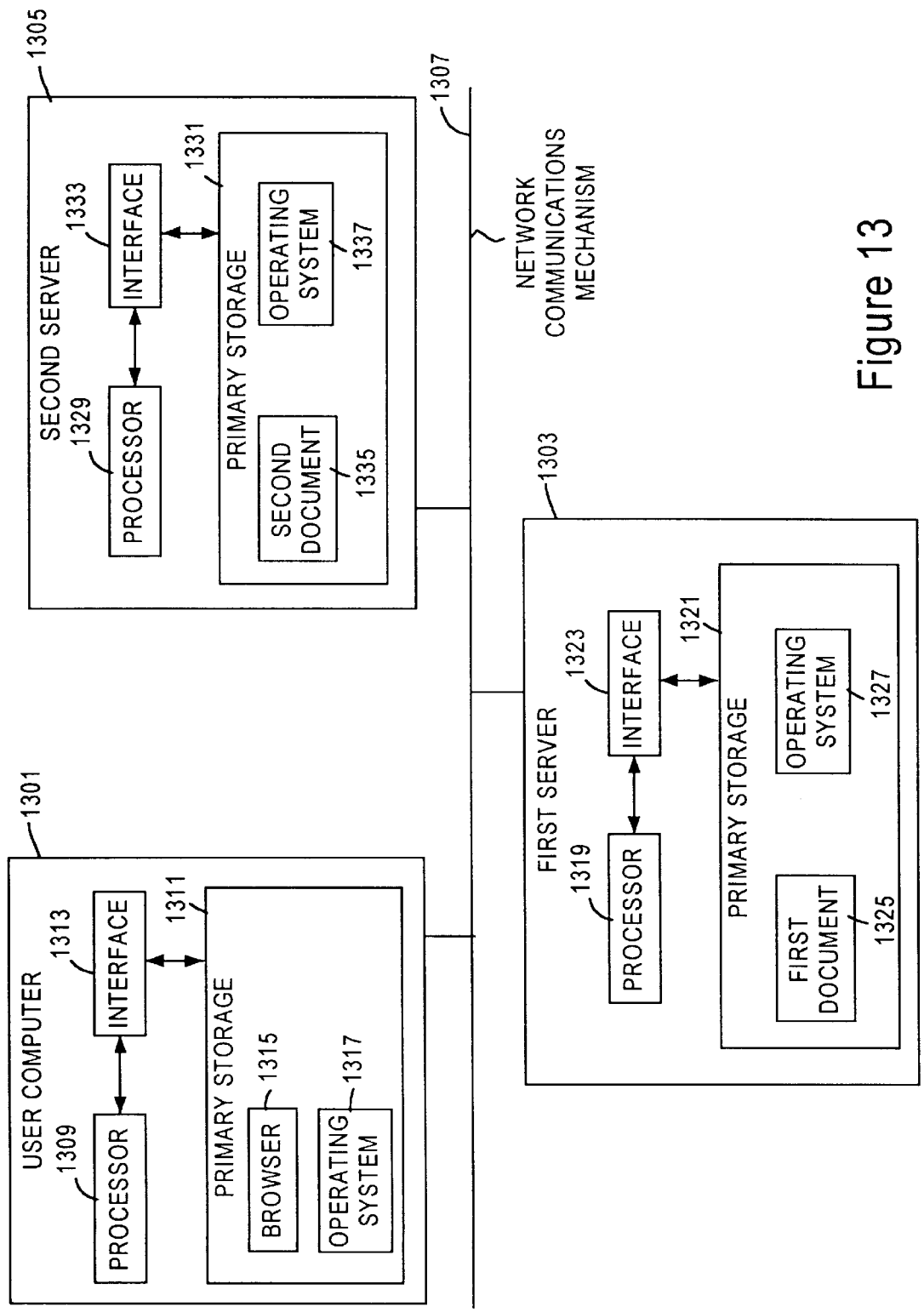
FIG. 13 is a block diagram of a network computer system for practicing the preferred embodiment of the present invention.

FIG. 13 is a block diagram of a network computer system 1300 for practicing the preferred embodiment of the present invention. The computer system 1300 includes a user computer 1301, a first server 1303, a second server 1305, and a network communications mechanism 1307.

The user computer 1301 includes a processor 1309, a memory 1311, and an interface 1313 for facilitating input and output in the user computer 1301. The memory 1311 stores a number of items, including a browser 1315, and an operating system 1317. The preferred browser is a Java™ enabled browser such as Hot Java™ from Sun Microsystems, Inc., of Mountain View, Calif.[1] The preferred operating system is the Solaris™ operating system from Sun Microsystems, Inc.

[1] Sun, Solaris, Java and Hot Java are trademarks or registered trademarks of Sun Microsystems, Inc., in the United States and other countries.

The first server 1303 includes a processor 1319, a memory 1321, and an interface 1323 for facilitating input and output in the first server 1303. The memory 1321 stores a number of items, including a first document 1325, and an operating system 1327. The preferred operating system is the Solaris operating system from Sun Microsystems, Inc. of Mountain View, Calif.

The preferred first document is a text document interspersed with constructs of the HTML markup language (e.g., a document for a web page). Another possibility would be a text document Page: 10 marked up with SGML (Standard Generalized Markup Language). In general, this embodiment does not require that the first document is encoded in HTML, If the first document is not encoded in HTML, SGML, or some other standard format, is acceptable.

This embodiment of the invention does rely on the title information being represented as text, though there is no requirement that the text be encoded in ASCII. For use with other languages, text may be encoded in Unicode (the preferred embodiment for non-European languages).

The second server 1305 includes a processor 1329, a memory 1331, and an interface 1333 for facilitating input and output in the second server 1305. The memory 1331 stores a number of items, including a second document 1335, and an operating system 1337. The preferred second document is a text document interspersed with constructs of the HTML markup language (e.g., a document for a second web page). The preferred operating system is the Solaris operating system from Sun Microsystems, Inc. of Mountain View, Calif.

The network communications mechanism 1307 provides a mechanism for facilitating communication between the user computer 1301, the first server 1303, and the second server 1305.

It should be noted that the user computer 1301, the first server 1303, and the second server 1305 may all contain additional components not shown in FIG. 13. For example, each computer could also include some combination of additional components including a video display device, an input device, such as a keyboard, mouse, or pointing device, a CD-ROM drive, and a permanent storage device, such as a disk drive.

DETAILED DESCRIPTION OF THE PREFERRED EMBODIMENTS

Figure 14:
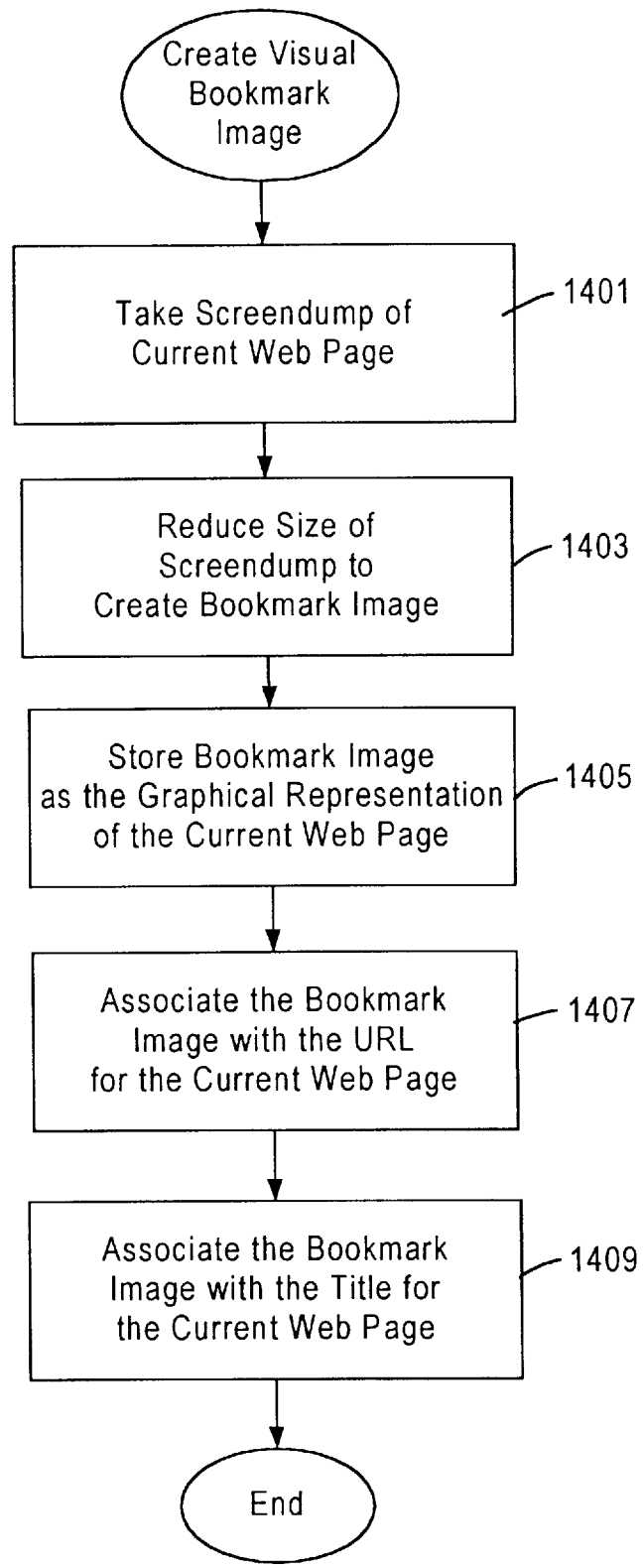
FIG. 14 is a flow diagram that illustrates the preferred steps for creating a bookmark image.

The preferred implementation of the present invention is perhaps best described through reference to FIGS. 14–17. FIG. 14 is a flow diagram which illustrates the preferred steps for creating a visual bookmark. In step 1401 the method takes a screendump of the visual appearance of the current web page displayed by the browser. In a preferred embodiment, the method takes the screendump using the "Snapshot" program of Sun Microsystems. Those of ordinary skill in the art will understand that on other computer platforms other screendump programs will be used. The programmer determines what is the best screendump facility for the particular platform when porting the system to a new platform. Any programmer with minimal knowledge of a particular platform would know what screendump program he or she likes.

In step 1403 the screendump is graphically reduced by a reduction factor, rho, that can be set as a user preference. In the preferred embodiment the default reduction factor is eighteen percent (18%). Thus, using the default value for rho, if the original web page was 200 pixels wide and 400 pixels high, the bookmark image will be 36 pixels wide (18% of 200) and 72 pixels high (18% of 400). The width and height of the bookmark image are both rounded to the nearest whole number of pixels.

In step 1405 the method stores the resulting bookmark image as the graphical representation of the current web page. In step 1407 the method associates the bookmark image with the URL for the current web page. Finally, in step 1409, the method associates the bookmark image with the title for the current web page. If no title is available on the web page, then the empty string is associated with the bookmark image.

Figure 15:
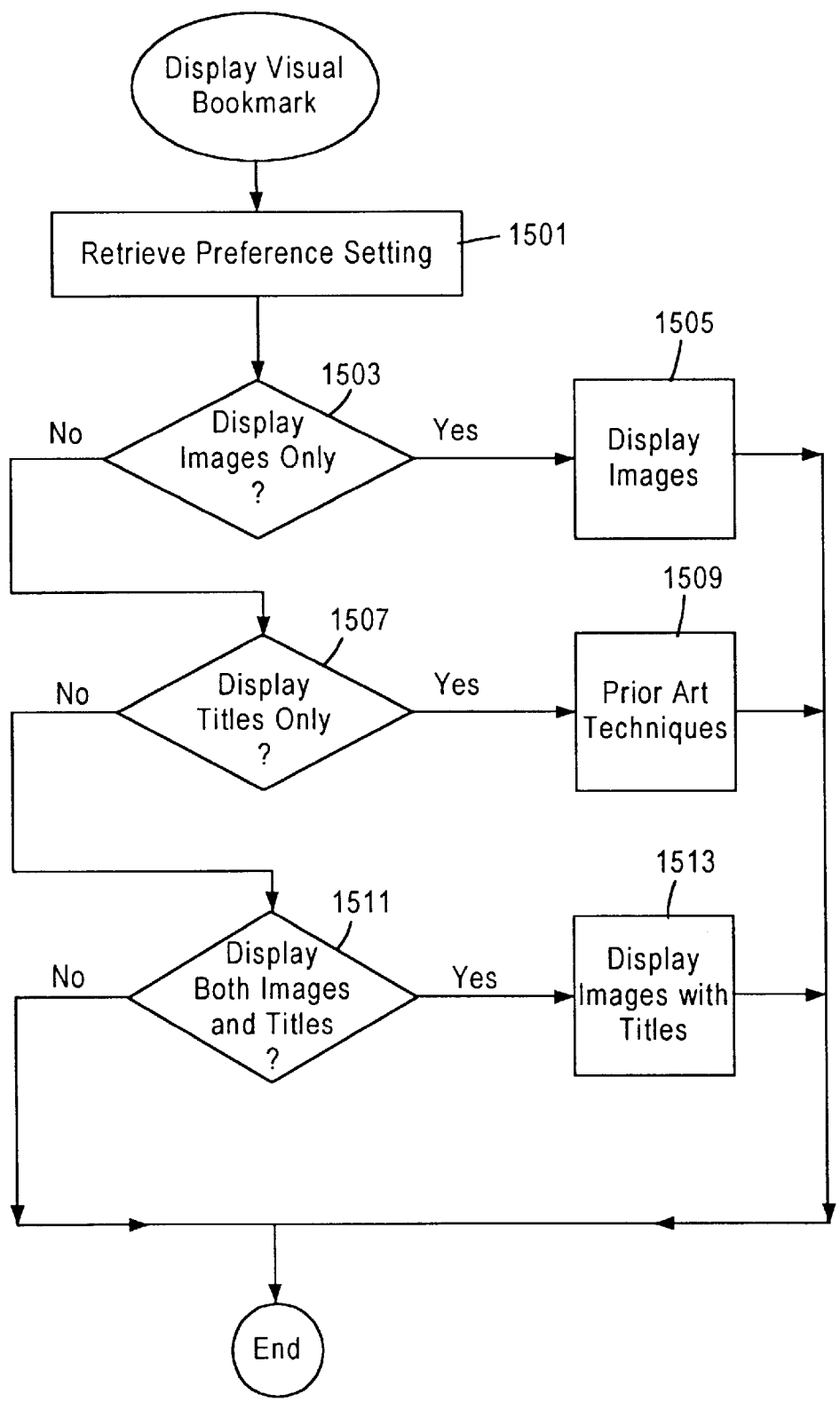
FIG. 15 is a flow diagram that illustrates the preferred steps for displaying a bookmark image.

FIG. 15 is flow diagram which illustrates the preferred steps for displaying visual bookmarks. Before the steps of FIG. 15 are carried out, however, a preference setting data structure is set which indicates how the visual bookmarks should be displayed. In the preferred embodiment, the browser has a preference setting which allows a user to switch between three different ways of displaying bookmarks: display images only, display titles only, and display both images and titles. The preferred default setting is to display both images and titles.

In step 1501, the method retrieves the preference setting to determine the display mode in which to display the bookmark images. In step 1503 the browser determines whether the preference setting is set to display images only. If the preference setting is set to display images only then in step 1507 the browser displays only images of the visual bookmarks. Upon completion of step 1507, the browser ends processing. However, if the preference setting does not indicate that only images should be displayed then, in step 1507, the browser determines whether the preference setting indicates that only titles should be displayed. If only title should be displayed then the browser displays those titles using techniques well known in the prior art (step 1509). Upon completion of step 1509 processing ends in the method to display bookmark images.

Returning to the discussion of step 1507, if the preference setting does not indicate that only titles should be displayed (step 1511), the method determines if the preference setting indicates that both images and titles should be displayed. If both images and titles should be displayed then, in step 1513, the method displays both images and titles. Upon completion of 1513, processing ends in the method to display bookmark images.

The preferred layout for displaying bookmark images is as follows: when the user requests to see the bookmark list, the browser presents a page with a two-dimensional layout of the bookmark images. The images run across the screen from left to right (if running in a locale where the reading direction is left-to-right) with a four-pixel blank space between each small image. If the bookmark display setting is set to display both images and titles then the title is shown under the image with the text word-wrapped to the width of the image. If rho is chosen as 18% then there will typically be room for five small images in each row. The browser continues to show images on as many additional rows as necessary. A vertical scrollbar should be used in case there are more rows than can be shown in the available window.

Figure 16:
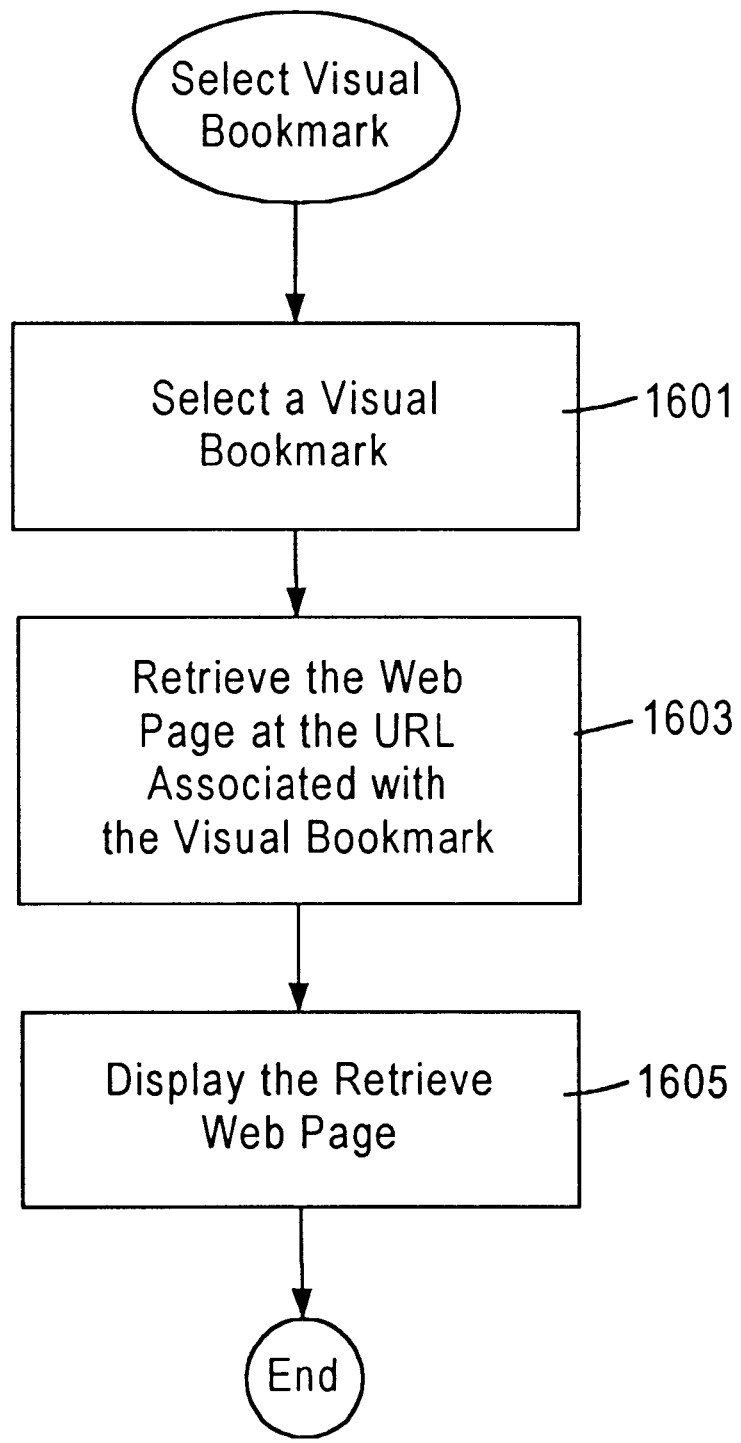
FIG. 16 is a flow diagram that illustrates the preferred steps for using a bookmark image.

FIG. 16 is a flow diagram which illustrates the preferred steps performed in response to a user selection of a bookmark image. In step 1601, the user selects a bookmark image. In step 1603 the user retrieves the web page at the URL associated with the bookmark image. In step 1605, the method displays the retrieved web page. Upon completion of step 1605 the method to use bookmark images ends processing.

Figure 17:
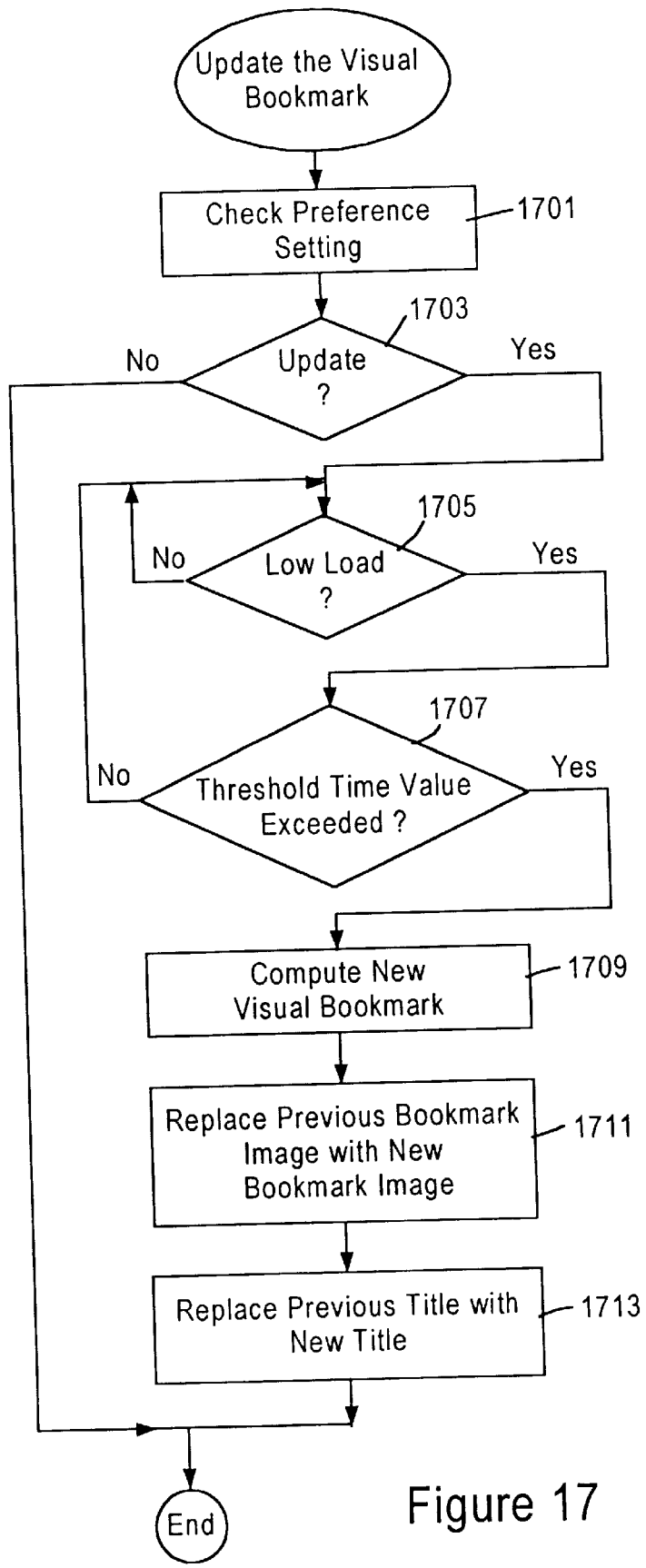
FIG. 17 is a flow diagram that illustrates the preferred steps for updating a bookmark image.

FIG. 17 is a flow diagram that illustrates the preferred steps for updating a bookmark image. In step 1701 the method checks an "update" preference settings data structure. The update preference settings data structure contains state data which indicates whether the bookmark images should be updated or whether they should be kept constant. In the preferred embodiment, the preference setting indicates that the bookmark image should be updated.

In step 1703 the method determines whether the preference setting data structure indicates that the bookmark image should be updated. If the preference setting indicates that the bookmark image should not be updated then processing in the method to update a bookmark image ends. However, if the preference setting indicates that the bookmark image should be updated, then in step 1705, the method preferably checks to determines if the computer on which the browser is currently running is experiencing at period of "low load".

A "period of low load" is defined as having all the following four conditions met at the time when retrieval of a page is started:
a) No input has been received from the user for at least 30 minutes
b) The computer's CPU utilization is less than 50%
c) The local area network's utilization is less than 25%
d) The connection between the LAN and the Internet has a utilization of less than 25%

(Note: the parameters can be set to desired values by a system administrator, but the values given here are recommended defaults).

If the computer system is not experiencing low load then processing cycles at step 1705. However, if the computer system is experiencing a low load then in step 1707, the method determines whether a treshold time value has been exceeded. In a preferred embodiment, a web page is retrieved if it is at least 24 hours since the browser last retrieved the web page. If the threshold time value has not been exceeded then processing cycles back to step 1705. If the treshold time value has been exceeded then processing continues with step 1709 where the method computes a new visual bookmark by taking a screendump of the web page associated with the bookmark image, and then reducing the size of the screendump to create a new bookmark image. In the preferred embodiment, when computing updated bookmark images, the browser draws the web page on an off-screen bitmap (thus making it invisible to anybody who might be looking at the computer screen). In step 1711 the method then replaces the previous bookmark image with the new bookmark image. In step 1713 the method replaces the previous title of the web page associated with the bookmark image with the new title associated with bookmark image. Upon completion of step 1713, processing ends in the method to update a visual bookmark.

While specific embodiments have been described herein for purposes of illustration, various modifications may be made without departing from the spirit and scope of the invention. For example, storage space may be conserved by converting the bookmark images into grayscale or black-and-white images before they are stored in the user does not have a color monitor. Also, if the web page being bookmarked contains so-called frames (a way of splitting the page up into different areas), then the bookmark image may be constructed either by capturing and reducing the entire page (this is the preferred embodiment) or by only capturing and reducing the main frame (usually, the main frame is defined as being the largest frame on the page).

Accordingly, the invention is not limited to the above described embodiments, but instead is defined by the claims in light of their full scope of equivalents.

What is claimed is:

1. A computer controlled method for updating a visual bookmark representing a web page, said visual bookmark including a location indicator for said web page and a current captured image of said web page; said method comprising steps of:
   (a) accessing said visual bookmark to retrieve said location indicator;
   (b) retrieving said web page using said location indicator;
   (c) generating a new captured image of said web page; in response to said retrieving and
   (d) replacing said current captured image with said new captured image in said visual bookmark.

2. The computer controlled method of claim 1 wherein said visual bookmark also includes a current title of said web page and said method further comprising:
   (e) retrieving a new title from said web page; and
   (f) replacing said current title in said visual bookmark with said new title.

3. The computer controlled method of claim 1 wherein said location indicator is a universal resource locator (URL).

4. The computer controlled method of claim 1 wherein step (c) generates said new captured image into an off-screen bitmap.

5. The computer controlled method of claim 1 wherein step (c) further comprises reducing said new captured image.

6. An apparatus having a central processing unit (CPU) and a memory coupled to said CPU for updating a visual bookmark representing a web page, said visual bookmark including a location indicator for said web page and a current captured image of said web page; said apparatus comprises:

an access mechanism configured to access said visual bookmark to retrieve said location indicator;

a retrieval mechanism configured to retrieve said web page using said location indicator;

an image generation mechanism configured to generate a new captured image of said web page; in response to retrieving said web page; and an image replacement mechanism configured to replace said current captured image with said new captured image in said visual bookmark.

7. The apparatus of claim 6 herein said visual bookmark also includes a current title of said web page and said apparatus further comprising:

a title retrieval mechanism configured to retrieve a new title from said web page; and a title replacement mechanism configured to replace said current title in said visual bookmark with said new title.

8. The apparatus of claim 6 wherein said location indicator is a universal resource locator (URL).

9. The apparatus of claim 6 wherein the image generation mechanism generates said new captured image into an off-screen bitmap.

10. The apparatus of claim 6 wherein step the image generation mechanism further comprises an image reduction mechanism configured to reduce said new captured image.

11. A computer program product comprising:

a computer usable storage medium having computer readable code embodied therein for updating a visual bookmark representing a web page, said visual bookmark including a location indicator for said web page and a current captured image of said web page; said computer readable code comprising:

computer readable program code configured to cause said computer to effect an access mechanism configured to access said visual bookmark to retrieve said location indicator;

computer readable program code configured to cause said computer to effect a retrieval mechanism configured to retrieve said web page using said location indicator;

computer readable program code configured to cause said computer to effect an image generation mechanism configured to generate a new captured image of said web page; in response to retrieving said web page; and computer readable program code configured to cause said computer to effect an image replacement mechanism configured to replace said current captured image with said new captured image in said visual bookmark.

12. The computer program product of claim 11 wherein said visual bookmark also includes a current title of said web page and said product further comprising:

computer readable program code configured to cause said computer to effect a title retrieval mechanism configured to retrieve a new title from said web page; and computer readable program code configured to cause said computer to effect a title replacement mechanism configured to replace said current title in said visual bookmark with said new title.

13. The computer program product of claim 11 wherein said location indicator is a universal resource locator (URL).

14. The computer program product of claim 11 wherein the image generation mechanism generates said new captured image into an off-screen bitmap.

15. The computer program product of claim 11 wherein step the image generation mechanism further comprises computer readable program code configured to cause said computer to effect an image reduction mechanism configured to reduce said new captured image.

* * * * *

UNITED STATES PATENT AND TRADEMARK OFFICE
CERTIFICATE OF CORRECTION

PATENT NO. : 5,963,964
DATED : Oct. 5, 1999
INVENTOR(S) : Nielsen

It is certified that error appears in the above-identified patent and that said Letters Patent is hereby corrected as shown below:

In the Claims, in Claim 1, line 9, after the word "page" remove semicolon (;) and in the same claim, line 10, insert the semicolon (;) before the word "and". In Claim 6, line 12, remove the semicolon (;) after the word "page" and finally, in Claim 11, line 18, after the word "page" remove the semicolon (;).

Signed and Sealed this

Eleventh Day of April, 2000

*Attest:*

Q. TODD DICKINSON

*Attesting Officer*  *Director of Patents and Trademarks*